United States Patent

Herman

[11] Patent Number: 6,090,360
[45] Date of Patent: Jul. 18, 2000

[54] METHOD FOR RECOVERING PARTICULATE SILICON FROM A BY-PRODUCT STREAM

[75] Inventor: John Eric Herman, Midland, Mich.

[73] Assignee: Dow Corning Corporation, Midland, Mich.

[21] Appl. No.: 08/388,915

[22] Filed: Feb. 15, 1995

[51] Int. Cl.[7] ................................................... C01B 33/037
[52] U.S. Cl. ............................................ 423/348; 210/771
[58] Field of Search ...................... 423/348, 349, 423/350; 210/634, 771, 772; 23/293 R, 293 A

[56] References Cited

U.S. PATENT DOCUMENTS

| | | | |
|---|---|---|---|
| 4,195,067 | 3/1980 | Katral et al. | 423/348 |
| 4,892,694 | 1/1990 | Riter et al. | 423/348 |
| 5,118,486 | 6/1992 | Burgie et al. | 423/349 |
| 5,175,329 | 12/1992 | Bokerman et al. | 556/467 |
| 5,326,896 | 7/1994 | Chadwick et al. | 556/446 |

*Primary Examiner*—Steven P. Griffin
*Assistant Examiner*—Stuart L. Hendrickson
*Attorney, Agent, or Firm*—William F. Boley

[57] ABSTRACT

A method for recovering particulate silicon essentially free of silicon containing compounds from a by-product stream containing metal salts and high-boiling silicon containing compounds having a boiling point higher than the sublimation temperature of the metal salts. The method comprises first separating the particulate silicon and other solids from the by-product stream by a method such as filtration. The particulates are then washed with a solvent having a boiling point lower than the sublimation temperature of the metal salt, thereby separating residual high-boiling silicon containing compound from the particulate silicon and other solids. The particulate silicon and other solids are then recovered in a dried form, essentially free of silicon containing compounds, by spray drying at a temperature lower than the sublimation temperature of the metal salt.

11 Claims, 1 Drawing Sheet

METHOD FOR RECOVERING PARTICULATE SILICON FROM A BY-PRODUCT STREAM

BACKGROUND OF INVENTION

The present invention is a method for recovering particulate silicon essentially free of silicon containing compounds from a by-product stream containing metal salts and high-boiling silicon containing compounds having a boiling point higher than the sublimation temperature of the metal salts. The method comprises first separating particulate silicon and other solids from the by-product stream by a method such as filtration. The particulates are then washed with a solvent having a boiling point lower than the sublimation temperature of the metal salt, thereby separating residual high-boiling silicon containing compounds from the particulate silicon and other solids. The particulate silicon and other solids are then recovered in a dried form, essentially free of silicon containing compounds, by spray drying at a temperature lower than the sublimation temperature of the metal salt.

Commercial process for producing chlorosilanes typically use fluidized-bed reactors in which particulate silicon is reacted with, for example, methyl chloride to form organochlorosilanes or hydrogen chloride to form chlorosilanes. During conduct of the fluidized-bed process a portion of the particulate silicon, typically referred to as "fines" exits the reactor along with product and feed gases. These fines can comprise as much as ten weight percent of the particulate silicon fed to the reactor. Therefore, these fines can represent a substantial volume of material whose final deposition must be managed in an economical and environmentally sound manner.

Also during conduct of the direct process, metals, such as aluminum, which are present as contaminates in the feed materials may be converted to metal salts such as aluminum trichloride. The sublimation of such metal salts during subsequent separation processes can cause clogging of separation equipment such as distillation columns, spray dryers, condensers and the like.

The gaseous mixture exiting the fluidized-bed reactor is typically distilled at a temperature where the desired organochlorosilanes or chlorosilanes are recovered as overheads and the silicon fines, higher-boiling silicon compounds, and metal salts are recovered as a liquid stream from the bottom of the still.

The present invention provides a method where the silicon fines and other solids can be recovered as a dry powder essentially free of silicon containing compounds by spray drying. Burgie et al. teach a spray drying process for separating particulate silicon from a liquid by-product stream containing silanes at a temperature within a range of about 35° C. to 750° C. In their Example, Burgie et al., U.S. Pat. No. 5,118,486, describe the liquid by-product stream as one recovered from a chemical vapor deposition process for making high purity silicon. Since chemical vapor deposition processes for making high purity silicon employ a high purity silane as the deposition gas, the problem of the presence of metal salts which can sublime and clog the spray drying equipment is not present.

The objective of the present invention is to provide a method where a spray drying process such as taught by Burgie et al. can be used to recover silicon fines free of silicon containing compounds in the presence of metal salts. This objective is achieved by washing the particulate silicon with a solvent having a boiling point lower than the sublimation temperature of the metal salt, thereby removing the higher-boiling silicon containing compounds and any residual monosilanes. The solvent can then be separated from the particulate silicon by a spray drying method such as taught in Burgie et al. at a temperature below the sublimation temperature of the metal salt.

Particulate silicon recovered by the present method is essentially free of silicon containing compounds and may therefore be more easily recycled to processes such as the direct process or may be disposed of by more economical environmentally appropriate methods.

SUMMARY OF INVENTION

The present invention is a method for recovering particulate silicon essentially free of silicon containing compounds from a by-product stream containing metal salts and high-boiling silicon containing compounds having a boiling point higher than the sublimation temperature of the metal salts. The method comprises first separating the particulate silicon and other solids from the by-product stream by a method such as filtration. The particulates are then washed with a solvent having a boiling point lower than the sublimation temperature of the metal salt, thereby separating residual high-boiling silicon containing compound from the particulate silicon and other solids. The particulate silicon and other solids are then recovered in a dried form, essentially free of silicon containing compounds, by spray drying at a temperature lower than the sublimation temperature of the metal salt.

DESCRIPTION OF DRAWING

Figure 1:
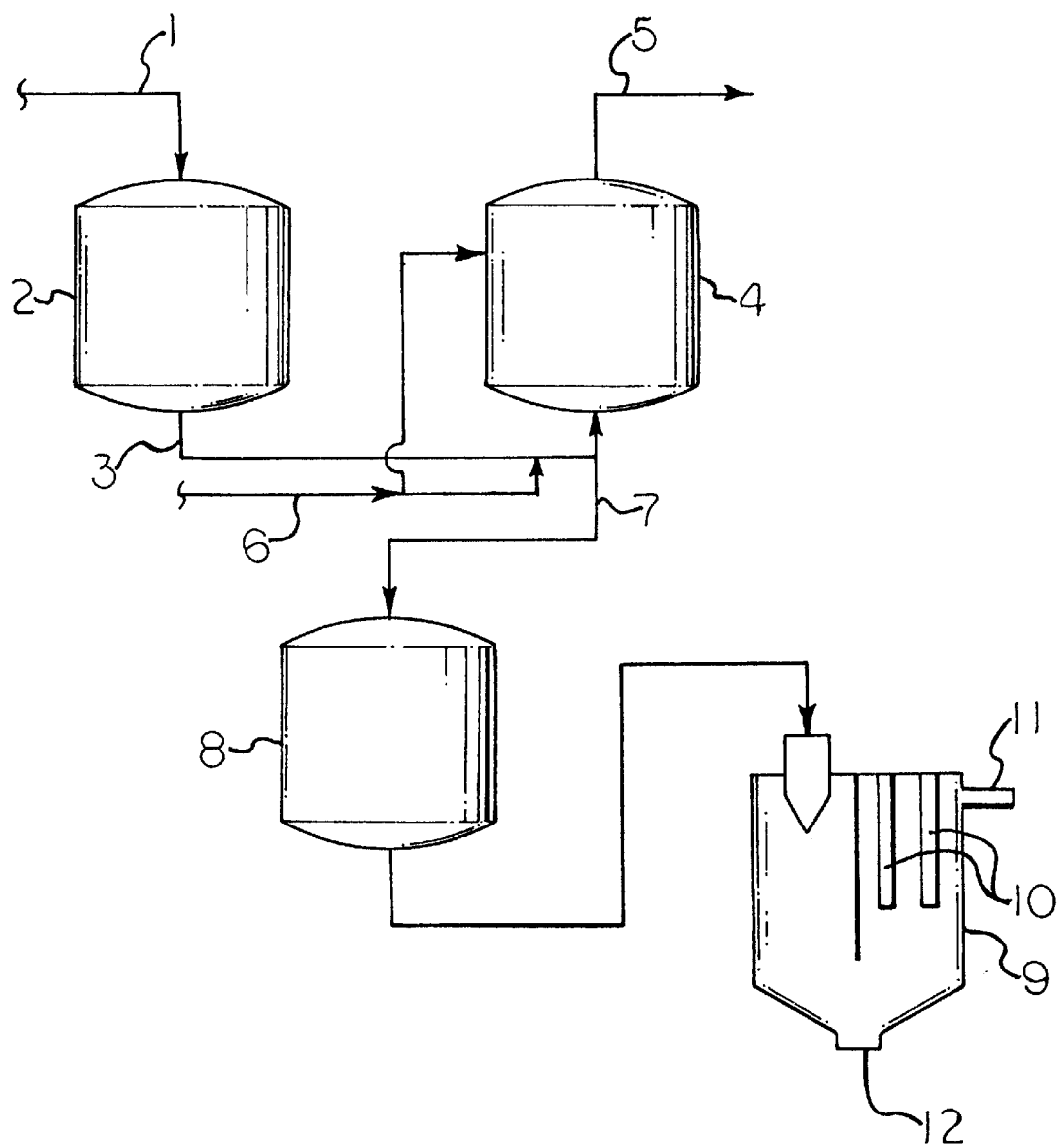
FIG. 1 is a schematic representation of an embodiment of the present method.

FIG. 1 is a schematic representation of an embodiment of the present method intended to facilitate understanding the present method but not to limited the claims herein. In FIG. 1 a by-product stream comprising particulate silicon, residual monosilanes, a high-boiling silicon containing compound, and a metal salt, where the high-boiling silicon containing compound has a boiling point higher than the sublimation temperature of the metal salt is fed through conduit 1 to slurry holding tank 2. The liquid by-product stream is fed from slurry holding tank 2 through conduit 3 to filter 4. Particulates present in the liquid by-product stream are retained in filter 4 while the liquid fraction exits through port 5 and is recovered. When the pressure drop across filter 4 reaches a level indicating that the filter is becoming blocked by the retained particulates, feed of the liquid by-product stream to filter 4 is stopped. A solvent is passed through conduit 6 to the filter to wash the retained particulates and remove residual high-boiling silicon containing compounds and monosilanes retained therein. The solvent containing the high-boiling silicon containing compounds and monosilanes exits through conduit 5 and can be processed as appropriate. The washed particulates are then dislodged from filter 4 and removed through conduit 7 by passing solvent, an inert gas such as nitrogen, or a mixture of both through conduit 6. The removed washed particulates pass through conduit 7 to slurry holding tank 8. From slurry holding tank 8, the particulate slurry is fed to spray dryer 9 where solvent is evaporated from the particulates and the particulates are collected on filters 10 positioned in spray dryer 9. A gas comprising the vaporized solvent, atomizing gas, and heating gas is recovered from spray dryer 9 through port 11. Particulate material collected on filters 10 is periodically dislodged from filters 10 and collect from port 12.

DESCRIPTION OF INVENTION

The present invention is a method for recovering particulate silicon from a by-product stream. The method comprises:

(A) substantially separating a liquid stream comprising particulate silicon, a metal salt, and a high-boiling silicon containing compound having a boiling point higher than the sublimation temperature of the metal salt, into a liquid component and a particulate component where the particulate component comprises the particulate silicon, the metal salt, and residual high-boiling silicon containing compound;

(B) washing the particulate component with a solvent having a boiling point lower than the sublimation temperature of the metal salt, thereby essentially separating the residual high-boiling silicon containing compound from the particulate silicon, and (C) recovering the particulate component by spray drying at a temperature lower than the sublimation temperature of the metal salt.

In step (A) of the present method a by-product stream is "substantially separated" into a liquid component and a particulate component where the particulate component comprises the particulate silicon, a metal salt, and a residual of the high-boiling silicon containing compound. By "substantially separating" it is meant that a major portion of the high-boiling silicon containing compound is separated from the particulate silicon. The separation of step (A) can be effected by standard means for separating particulates from liquids, where the means does not require temperatures above the sublimation temperature of the metal salt and the separated particulates can be washed to remove or replace liquids entrained therein. The separation can be effect by, for example, filtration, centrifugation, or settling. A preferred method is filtration.

The source of the by-product stream is not critical to the present method. However, the present method is considered particularly effective for recovering particulate silicon from by-product streams from direct processes for the production of chlorosilanes and organochlorosilanes. These direct processes include the reaction of hydrogen chloride with particulate silicon to form chlorosilanes such as trichlorosilane and tetrachlorosilane, and the reaction of methyl chloride with particulate silicon to form methylchlorosilanes.

A typical process for producing chlorosilanes or organochlorosilanes is conducted as a continuous process in a fluidized-bed reactor. Excess feed gases, reaction product gases, and particulates entrained in exiting gases exit the reactor to a distillation train where monosilanes are recovered as a low-boiling overhead fraction. Depending upon the feed to the fluidized-bed reactor, the low-boiling monosilane fraction can include, for example, trichlorosilane, tetrachlorosilane, trimethylchlorosilane, dimethyldichlorosilane, and methyltrichlorosilane. The bottom fraction remaining after distillation is a by-product stream which can contain a significant fraction of the low-boiling monosilanes, higher boiling silicon containing compounds, and particulates carried over from the reactor such as silicon, silicon dioxide, metal oxides, and metal salts. The type of high-boiling silicon containing compounds, depending upon the feed to the fluidized-bed reactor, can be, for example, polysilanes, polysiloxanes, and silylmethylenes. A typical composition for a by-product stream resulting from the reaction of hydrogen chloride with particulate silicon is provided in the example herein. Typical compositions for by-product streams resulting from the reaction of methyl chloride with particulate silicon are described in, for example, Chadwick et al., U.S. Pat. No. 5,326,896, and in Bokerman et al., U.S. Pat. No. 5,175,329, both of which are incorporated by reference herein as examples of by-product streams which may be used in the present method.

The advantage of the present method is realized when the by-product stream contains a metal salt which has a sublimation temperature lower than the boiling point of the high-boiling silicon containing compounds. Although the type of metal salt is not critical to the present invention, when the by-product stream is from a direct process for preparing chlorosilanes or organochlorosilanes, the metal salt typically of concern is aluminum trichloride. The aluminum trichloride is principally the result of chlorination of aluminum metal provided to the process as a contaminate in the particulate silicon.

The presence of a metal salt having a temperature of sublimation less than the boiling point of the high-boiling silicon containing compound in a by-product stream complicates the spray drying of the particulates in the by-product stream. In order to separate the high-boiling silicon containing compound from the particulate silicon the spray dryer must be operated at a temperature at least that of the boiling point of the high-boiling silicon containing compound. Since this temperature is above the sublimation temperature of the metal salt, the metal salt will sublimate and can thereafter deposit on cooler surfaces causing, problems with the spray drying apparatus such as clogging of conduits, filters, and the like and heat transfer problems.

To overcome the above stated problem, the present method has step (B) which requires washing the particulate component with a solvent having a boiling point lower than the sublimation temperature of the metal salt. The solvent wash removes the higher-boiling silicon containing compound from the particulate component providing a particulate component essentially free of the high-boiling silicon compound and also removes any residual monosilanes. The only restriction on the solvent is that it have a boiling point lower than that of the metal salt. The solvent can be an organic, inorganic, or chlorosilane solvent. When the by-product stream results from a direct process for making chlorosilanes, it is preferred that the solvent be selected from a group consisting of trichlorosilane, tetrachlorosilane, and mixtures thereof. When the by-product stream results from a direct process for making methylchlorosilanes, it is preferred that the solvent be selected from a group consisting of methyltrichlorosilane, dimethyldichlorosilane, trimethylchlorosilane, and mixtures thereof. The wash effluent can be further treated by processes such as distillation to recover useful components of the wash.

In step (C) of the present method the washed particulate component is spray dried at a temperature lower than the sublimation temperature of the metal salt to recover a particulate component essentially free of the high-boiling silicon containing component. The method of recovering the particulate component by spray drying is not critical as long as the temperature is not raised substantially above the sublimation temperature of the metal salt. By a temperature of "substantially above the sublimation temperature" it is meant that the temperature is not so high as to cause sublimation of the metal salt at a level unacceptably detrimental to the spray drying process. For example, when the metal salt is aluminum trichloride a preferred temperature for running the spray dryer is within a range of about 60° C. to 80° C.

A useful method for spray drying the washed particulate component is described, for example, in Burgie et al., U.S Pat. No. 5,118,486, which is hereby incorporated herein by reference.

In a preferred process the washed particulate component as a slurry in a solvent is atomized by passing through a two-fluid pressure type nozzle comprising two concentric channels. A preferred two-fluid atomizing nozzle consists of an inner concentric channel for feeding the washed particulate component into the heated zone of the spray dryer chamber, and an outer concentric channel for feeding a high pressure atomizing gas, which facilitates atomization of the by-product stream. The by-product stream and the high pressure atomizing gas can be mixed either internally, while inside the two-fluid atomizing nozzle, or externally, upon expulsion into the heated zone of the spray dryer. Preferred is when the by-product stream and the high pressure atomizing gas are mixed externally in the heated zone. The high pressure atomizing gas fed through the outer concentric channel of the atomizing nozzle can be any inorganic or inert gas as described in Burgie et al., supra. When the by-product stream is from a direct process for making chlorosilanes a preferred high pressure atomizing gas is tetrachlorosilane.

The atomized stream comprising the washed particulate component and solvent slurry is passed into a heated zone to effect vaporization of the solvent. The heated zone is created by introducing a preheated gas into the area immediately adjacent to the exit of the atomizing nozzle. The preheated gas can be any gas that can be preheated to a temperature sufficient to vaporize the solvent from the atomized slurry comprising the washed particulates and solvent. The preheated gas can be, for example, an inorganic gas, an inert gas, monosilanes, hydrogen, or a mixture thereof. When the by-product stream is from a direct process for making chlorosilanes a preferred preheated gas is nitrogen.

The temperature of the preheated gas must be such that the temperature of the heated-zone is within a range of at least the boiling point of the solvent and lower than the temperature of the sublimation point of the metal salt. When the metal salt is aluminum trichloride, the wash solvent is tetrachlorosilane, and the preheated gas is nitrogen the temperature of the heated-zone can be within a range of about 25° C. to less than 120° C. More preferred is when the temperature of the heated zone is within a range of about 60° C. to 80° C.

The solvent is vaporized to a gas in the heated zone, resulting in a particulate comprising silicon entrained in a gaseous mixture comprising the solvent and process gases. The particulate comprising the silicon can be separated from the gaseous mixture by standard means for separating particulates from gases, for example, filtration, agglomeration, electrostatic precipitation, or cyclone filtration. In a preferred embodiment, the gaseous mixture transport the particulate component to a filtration area where the particulates are filtered from the gaseous mixture.

Standard filtration methods, for example as described in Burgie et al., supra, for separating gas-solid mixture can be used to effect the separation of the particulates from the gaseous mixture. Filtration can be conducted using a batch-type filter positioned, for example, in a pressure vessel. Preferred is when the filter elements are a porous sintered metal.

Particulates entrained in the gaseous mixture are collected by the filter elements as the gaseous mixture pass through the filter elements. In a preferred embodiment, the particulates collected by the filter elements is periodically purged from the filter elements by a pulsed gas and directed into a collection device for further silicon recovery. In the present method, the filter can either be located in a filtration area incorporated within the spray drying apparatus or can be separate from the spray dryer.

A particulate component essentially free of the high-boiling silicon containing compound is recovered by the present method. By "essentially free" it is meant that a residual amount of the high-boiling silicon containing compound that was not removed by the solvent wash may still be associated with the particulate component. However, it is preferred that all detectable high-boiling silicon containing compounds be removed from the particulate component during the washing step. Recovered particulate silicon may be recycled back to the original process from which the by-product stream originated or may be disposed of by appropriate methods.

An advantage of the present method is that the volume of the by-product stream constituents that must be disposed of can be significantly reduced. Low-boiling monosilanes can be recovered as useable product. The high-boiling silicon containing compounds when isolated are in a smaller volume of material to be handled. The high-boiling silicon compounds may be further processed to form useable monosilanes. The recovered particulate silicon is essentially free of chlorosilanes, making handling and disposition of the material easier.

The following example is provided to illustrate the initial separating and washing steps of the present invention. This example is not intended to limited the scope of the claims herein.

Example. The ability to filter and wash a particulate silicon containing by-product stream to free of high-boiling silicon containing compounds was evaluated.

A by-product stream from a fluidized-bed process reacting hydrogen chloride with particulate silicon was used. Fifteen cycles of the filtering and wash process were run to evaluate the longevity of the filter element. During the course of the 15 cycles, the by-product stream contained an average of 9.4 weight percent solids prior to filtering. Typically about 17 weight percent of the solids was aluminum trichloride, with silicon fines representing about 30 to 70 weight percent of the solids and the remaining solids consisting of silicon dioxide and other metal chloride and oxides. About 10 weight percent of the by-product stream was high-boiling silicon containing compounds having a boiling point above that of tetrachlorosilane. About two-thirds of the high-boiling silicon containing compounds was $Cl_6Si_2$, with the remaining about one-third being disiloxanes. Trichlorosilane and tetrachlorosilane comprised about 80 weight percent of the by-product stream.

The filter apparatus consisted of a stainless steel housing containing a single sintered metal filter element. The filter element was a 7.6 cm by 122 cm cylinder having an average pore size of 5 micrometers (Mott Metallurgical Corporation, Farmington, CT). The by-product stream, in the form of a slurry, was fed to the filter at a rate of 2.6 to 3.8 liters per minute (gpm). Pressure drop across the filter was monitored until it reached about 25 psig and then the feed was stopped. Typically at this point the filter contained about 10.8 kg/m$^2$ of filtercake. The filtercake was washed with about 46 liters of tetrachlorosilane (1.2 filter apparatus volumes). Monitoring of the effluent from the filter apparatus indicated that greater than 99 weight percent of the effluent was tetrachlorosilane at the end of the wash step. Monitoring of the effluent stream from the filter apparatus during filtering and washing procedures indicated that the effluent contained less than 0.1 weight percent solids. The filter cake was then washed from the filter element using additional tetrachlorosilane. The above filtration, washing, and particulate recovers steps were repeated an additional 14 times to test the longevity of the filter element in the process.

I claim:

1. Method for recovering particulate silicon from a liquid by-product stream, the method comprising:

(A) substantially separating a liquid stream comprising particulate silicon, a metal salt, and a high-boiling silicon containing compound having a boiling point higher than the sublimation temperature of the metal salt, into a liquid component and a particulate component where the particulate component comprises the particulate silicon, the metal salt, and residual high-boiling silicon containing compound;

(B) washing the particulate component with a solvent having a boiling point lower than the sublimation temperature of the metal salt, thereby essentially separating the residual high-boiling silicon containing compound from the particulate component, and (C) recovering the particulate component by spray drying at a temperature lower than the sublimation temperature of the metal salt.

2. A method according to claim 1, where the separation of the liquid stream of step (A) into a liquid component and a particulate component is effected by filtration.

3. A method according to claim 1, where the liquid stream of step (A) is a by-product stream resulting from the reaction of hydrogen chloride with particulate silicon.

4. A method according to claim 1, where the liquid stream of step (A) is a by-product stream resulting from the reaction of methyl chloride with particulate silicon.

5. A method according to claim 1, where the metal salt is aluminum trichloride.

6. A method according to claim 1, where the liquid stream of step (A) is a by-product stream resulting from the reaction of hydrogen chloride with particulate silicon and the solvent is selected from the group consisting of trichlorosilane, tetrachlorosilane, and mixtures thereof.

7. A method according to claim 6, where the solvent is tetrachlorosilane.

8. A method according to claim 1, where the liquid stream of step (A) is a by-product stream resulting from the reaction of methyl chloride with particulate silicon and the solvent is selected from the group consisting of methyltrichlorosilane, dimethyldichlorosilane, trimethylchlorosilane, and mixtures thereof.

9. A method according to claim 1, where the metal salt is aluminum trichloride and spray drying is effected at a temperature within a range of about 60° C. to 80° C.

10. A method according to claim 7, where the metal salt is aluminum trichloride and spray drying is effected at a temperature within a range of about 60° C. to 80° C.

11. A method according to claim 1, where separation of the liquid stream of step (A) into a liquid component and a particulate component is effected by filtration, the liquid stream is a by-product stream resulting from the reaction of hydrogen chloride with particulate silicon, the metal salt is aluminum trichloride, the solvent is tetrachlorosilane, and spray drying is effected at a temperature within a range of about 60° C. to 80° C.

* * * * *